United States Patent Office 3,168,290
Patented Feb. 2, 1965

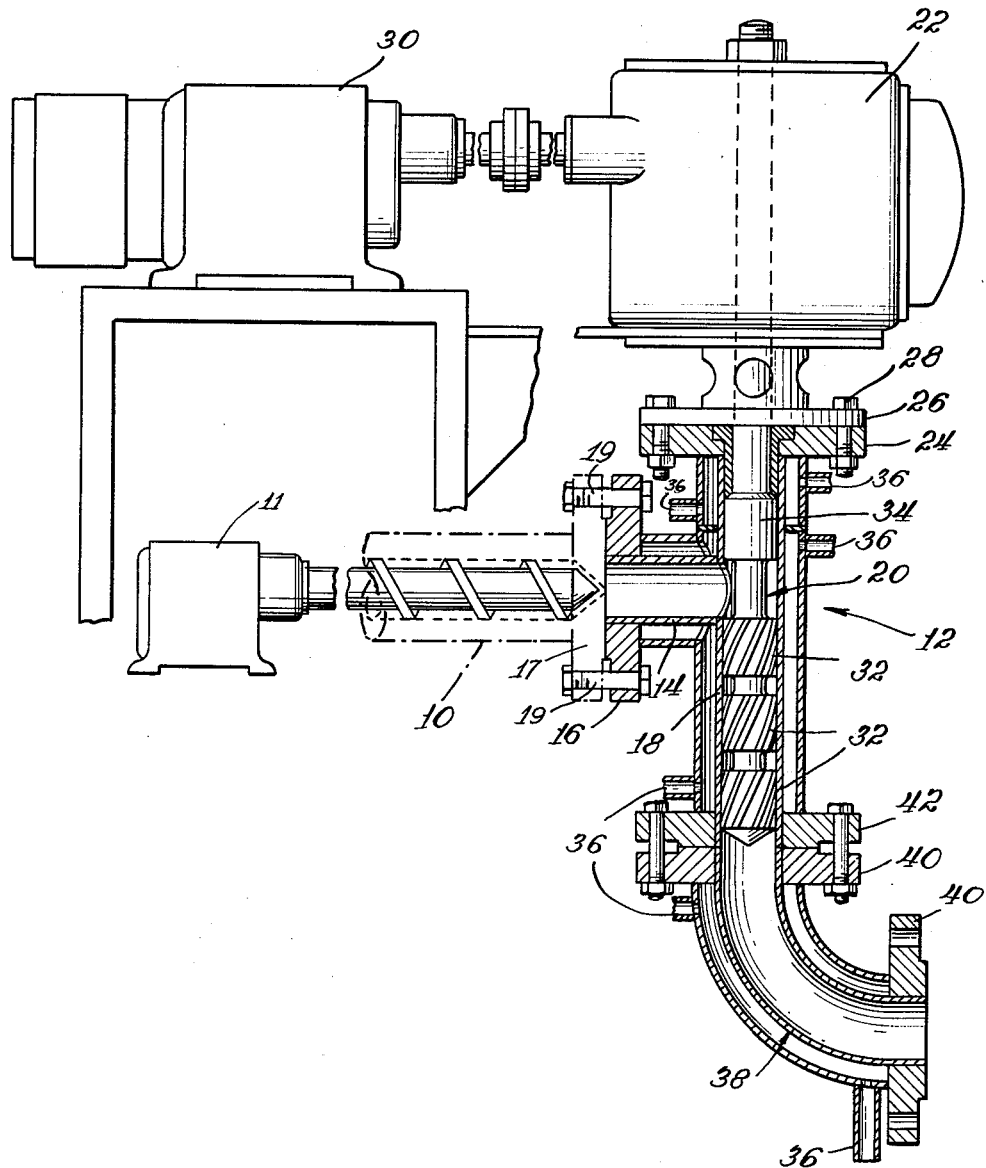

3,168,290
MIXING SINGLE SCREW EXTRUDER
Theodore C. Wallace, Torrance, Calif., assignor to The Dow Chemical Company, Midland, Mich., a corporation of Delaware
Filed June 20, 1962, Ser. No. 203,844
3 Claims. (Cl. 259—8)

This invention relates to an improvement in plastic material treating apparatus, and more particularly, to a single screw mixing extruder.

As a general rule, extruders do not function as efficient mixers. The device of the present invention may be used upon an extruder to provide a high degree of mixing for: (a) even dispersion of pigments or dyes, (b) even dispersion of plasticizers, (c) a more uniform temperature throughout the plastic melt. In addition to its small size, the subject device can be used to change the direction of flow of the mixed material to 90° with respect to the extruder barrel. This is a desirable feature since it makes it possible to provide greater flexibility in plant arrangement with respect to location of one or more extruders. Another feature of the subject invention is that rotation of the mixing screw is independent of rotation of the extruder screw. Accordingly, the quantity of the finished product delivered by the mixer is dependent on the rotational speed of the extruder screw, while the degree of mix is dependent upon the rotational speed of the mixing screw.

The main object of this invention is to provide an improvement in plastic material treating apparatus.

A more specific object is to provide a device which may be readily applied to an extruder to achieve: (a) even dispersion of pigments or dyes, (b) even dispersion of plasticizers, (c) a more uniform temperature throughout the plastic melt.

Another object of the invention is to provide greater flexibility in extruder location since the device may be used to change flow direction of extruded product 90° with respect to the extruder barrel.

Still another object is to provide a mixing device for use on an extruder whereby the quantity of the finished product delivered is dependent on the rotational speed of the extruder screw, while the degree of mix is dependent upon the rotational speed of the mixing screw.

Another object is to provide a mixing device for attachment to an extruder which is of simple design, easy to install and maintain, and which will provide long and dependable service.

These and further objects and features of the invention will become more apparent from the following disclosure and accompanying drawing wherein the single figure shown illustrates an embodiment of the invention.

Referring now to the drawing, the numeral 10 identifies the end, or barrel, of an extruder, which may be arranged in a horizontal position, as shown. The extruder is driven by variable speed drive means 11. An extruder mixer assembly 12, incorporating the principles of the invention, is affixed to the end of the extruder 10. The assembly 12 includes a pipe 14 affixed to a flange 16, which may be removably secured to the exit flange 17 of the extruder by bolt means 19. The pipe 14 opens into and is securely fixed in liquid tight manner to a pipe 18 which extends at right angles to the pipe 14.

A mixing torpedo 20 is rotatably supported in the pipe 18, which torpedo is in driven connection with a gear reducer 22. For such purposes a flange 24 is secured to the upper end of the pipe 18, which flange is attached to a flange 26 affixed to the lower portion of the gear reducer 22, by fastening means such as bolts 28. A variable speed drive means 30 is coupled to the gear reducer 22.

The mixing torpedo 20, has three discrete screw thread portions 32, of a maximum diameter slightly less than the internal diameter of the pipe 18, which function to mix the material being ejected from the extruder 10. A non-threaded portion 34 of the mixing torpedo 20, prevents material from moving upwardly in the pipe 18. The pipes 14 and 18 are jacketed to allow for flow of temperature control medium thereabouts, which medium is conducted to the jacketed volumes by piping (not shown) which connects with nipples 36 secured to the jacketing.

Affixed to the lower end of the pipe 18, is a 90° elbow 38, which conducts material from the pipe 18 into a direction which is parallel with the extruder barrel 10. In certain installations, use of the elbow 38, may be dispensed with. A flange means 40 is affixed to one end of the elbow 38 for connection to a flange means 42 secured to the lower end of the pipe 18. A similar flange means 40 is affixed to the other end of the elbow for connection with a delivery pipe (not shown). The elbow 38 is jacketed for circulation of temperature control medium, as in the manner and for the purpose of the pipes 14 and 18.

From the foregoing it will be seen that the disclosed invention will satisfy all of the objectives set forth hereinbefore.

The foregoing description has been given in detail without thought of limitation since the inventive principles involved are capable of assuming other forms without departing from the spirit of the invention or the scope of the following claims.

What is claimed is:

1. The combination of an extruder and a mixer assembly, and separate independent drive means for said extruder and for said mixer assembly, said mixer assembly being attached to the discharge end the barrel of the extruder and comprising pipe means having a longitudinal axis extending at an angle to the longitudinal axis of said extruder barrel and in open communication therewith at a juncture, a mixing torpedo located within said pipe means and including discrete screw portions juxtapositioned with said juncture, said torpedo being driven by said mixer assembly drive means.

2. The combination of an extruder and a mixer assembly, and separate independent drive means for said extruder and for said mixer assembly, said mixer assembly being attached to the discharge end of the barrel of the extruder and comprising pipe means having a longitudinal axis extending at an angle to the longitudinal axis of said extruder barrel and in open communication therewith at a juncture, a mixing torpedo located within said pipe means and including discrete screw portions juxtapositioned with said juncture, said torpedo being driven by said mixer assembly drive means, and means affixed to one end of said pipe means to change the direction of flow of material leaving the pipe means.

3. The combination of an extruder and a mixer assembly, and separate independent drive means for said extruder and for said mixer assembly, said mixer assembly being attached to the discharge end of the barrel of the extruder and comprising pipe means having a longitudinal axis extending at an angle to the longitudinal axis of said extruder barrel and in open communication therewith at a juncture, a mixing torpedo located within said pipe means and including at least three discrete screw portions spaced below said juncture, said torpedo being driven by said mixer assembly drive means, and a 90° elbow affixed to the discharge end of said pipe means.

References Cited in the file of this patent

UNITED STATES PATENTS

| | | |
|---|---|---|
| 2,453,088 | Dulmage | Nov. 2, 1948 |
| 2,857,144 | Gurley | Oct. 21, 1958 |
| 2,861,784 | Masek | Nov. 25, 1958 |
| 2,953,460 | Baker | Sept. 20, 1960 |
| 3,026,273 | Engles | Mar. 20, 1962 |